Figure 1:
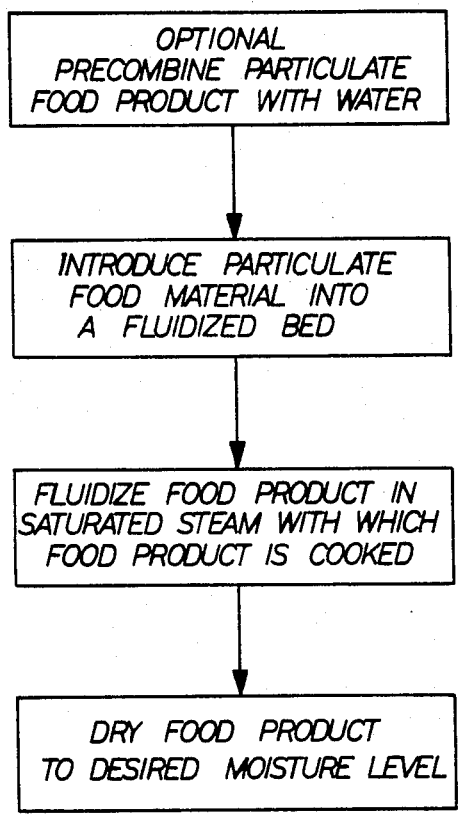

United States Patent [19]
Sturgeon

[11] Patent Number: 4,473,593
[45] Date of Patent: Sep. 25, 1984

[54] PROCESS FOR PREPARING QUICK-COOKING FOOD PRODUCTS

[75] Inventor: Lloyd F. Sturgeon, Oreland, Pa.

[73] Assignee: Proctor & Schwartz, Horsham, Pa.

[21] Appl. No.: 357,999

[22] Filed: Mar. 15, 1982

[51] Int. Cl.³ .......................... A23B 7/02; A23L 1/10; A21D 6/00

[52] U.S. Cl. .................. 426/461; 426/462; 426/510; 426/557

[58] Field of Search .............. 426/462, 461, 458, 510, 426/511, 508, 557; 34/57 A

[56] References Cited

U.S. PATENT DOCUMENTS

| | | | |
|---|---|---|---|
| 2,696,156 | 12/1954 | Campbell et al. | 426/462 |
| 2,828,209 | 3/1958 | Hollis et al. | 426/462 |
| 2,992,921 | 7/1961 | Bardet et al. | 99/80 |
| 3,083,102 | 3/1963 | Carcassonne-Leduc | 426/461 |
| 3,157,514 | 11/1964 | Gorozpe | 99/80 |
| 3,537,862 | 11/1970 | Peters et al. | 426/510 |
| 4,133,898 | 1/1979 | Carlson et al. | 426/462 |
| 4,208,439 | 6/1980 | Hsu | 426/557 |
| 4,385,074 | 5/1983 | Weibye | 426/462 |
| 4,387,630 | 6/1983 | Timbers et al. | 99/348 |

FOREIGN PATENT DOCUMENTS

487631 12/1975 U.S.S.R. .................. 426/462

*Primary Examiner*—George Yeung
*Attorney, Agent, or Firm*—Richard H. Thomas

[57] ABSTRACT

A process for preparing "quick-cooking" food products which comprises introducing particulate food material selected from the group consisting of rice, cereal, grain, pasta, or mixtures thereof into a fluidized bed; fluidizing said particulate food material utilizing steam as the fluidizing medium until the moisture content of said particulate food material is increased to a first predetermined level; drying said particulate food materials until a second predetermined moisture level is achieved, said second predetermined moisture level being effective to render said food material stable and nonfermenting during subsequent storage.

8 Claims, 4 Drawing Figures

PROCESS FOR PREPARING QUICK-COOKING FOOD PRODUCTS

The present invention relates to a novel method for the preparation of so-called "quick-cooking food products such as rice, cereals, grains, pasta and beans and other vegetable products.

BACKGROUND OF THE PRESENT INVENTION

"Quick-cooking" food products are conventionally prepared by boiling in water or exposing the same to steam until a desired amount of moisture is absorbed by the product. The so-called "quick-cooking" varieties of these products are typically prepared by precooking to a predetermined moisture content and subsequently drying to a stable condition prior to sale. Such products can then be recooked particularly rapidly because their pretreatment has rendered them more hygroscopic such that they reabsorb moisture at a faster rate than during conventional cooking.

Several processes have been described in the art for preparing "quick-cooking" food products. For example, U.S. Pat. No. 2,992,921 describes a process for rendering brown rice quick cooking which comprises blowing hot air at a temperature of 450° to 600° F. and a velocity of about 2,500 feet per minute through the brown rice for a period of 10 to 30 seconds and immediately thereafter cooling the rice with relatively cool air to prevent overcooking. It is indicated in the patent that the product thus treated is easy to cook.

U.S. Pat. No. 3,157,514 describes another method for preparing "quick-cooking" rice which comprises hydrating the rice at below the gelatinization temperature to a moisture content of between 25% and 40% and subsequently alternately hydrating the rice with water and then steam at a temperature above about 55° C., finally completing the hydrating process by exposure to alternate steam and water treatments at a temperature below 55° C.

Still another process for preparing "quick-cooking" rice is described in U.S. Pat. No. 4,133,898. According to this patent, the rice is soaked in water then cooked for a predetermined length of time by boiling in water and subsequently dried in a centrifugal fluidizing bed dryer. If desired, the rice after cooking but before drying can be treated with water at ambient temperature to prevent overcooking.

All of these prior art processes require copious amounts of energy to accomplish the preparation of "quick-cooking" food products. In each case, either alternate heating and cooling cycles are utilized or excess moisture is added to the rice during the cooking process which subsequently must be removed during drying at the expense of considerable expenditure of energy. There is also the tendency of the sticky starch product to coat the multiple conveyors which may be employed and other surfaces, a problem alluded to in the '898 patent, requiring frequent washing of equipment or other measures.

SUMMARY OF THE PRESENT INVENTION

The present invention resides in a new energy efficient process for preparing "quick-cooking" food products. The invention will be described with particular reference to preparing "quick-cooking" rice, but it will be apparent to those skilled in the art that the present invention is useful in the preparation of other "quick-cooking" food products. The instant process comprises fluidizing the particulate food product using a steam atmosphere as the fluidizing medium until the moisture level of the food product is raised to a predetermined level and subsequently cooling and drying the food product to a second predetermined moisture level, preferably also in a fluidized bed.

By using the same medium, the steam, for both fluidization and cooking, sticking and clumping of the food product is minimized, excess moisture is not present in the cooked food product and therefore does not have to be subsequently removed by drying, processing steps are minimized, and an energy efficient process for producing "quick-cooking" food products is obtained.

DESCRIPTION OF THE DRAWINGS AND DETAILED DESCRIPTION OF THE INVENTION

Figure 2:
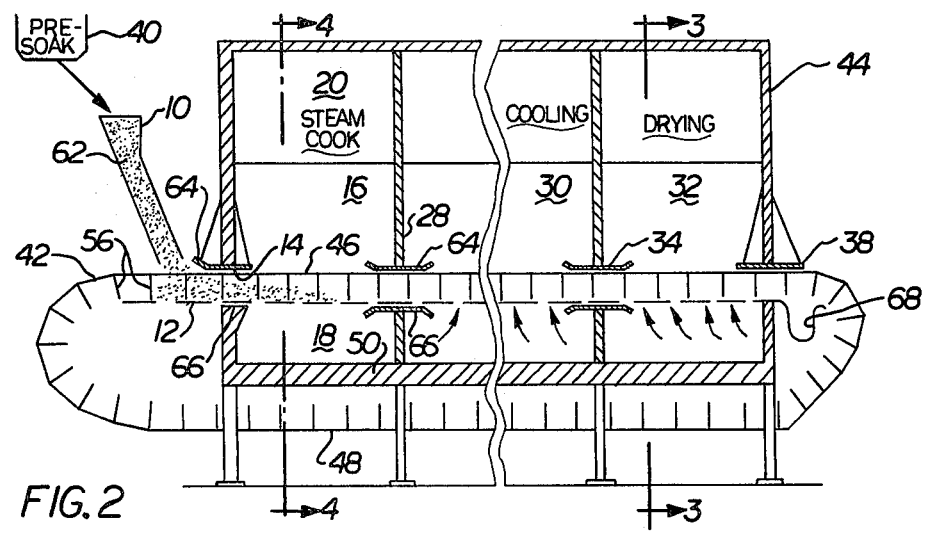
Figure 3:
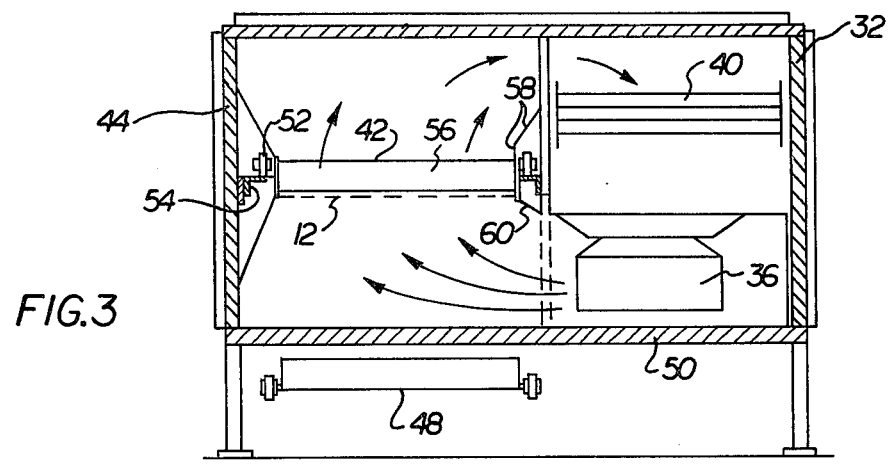
Figure 4:
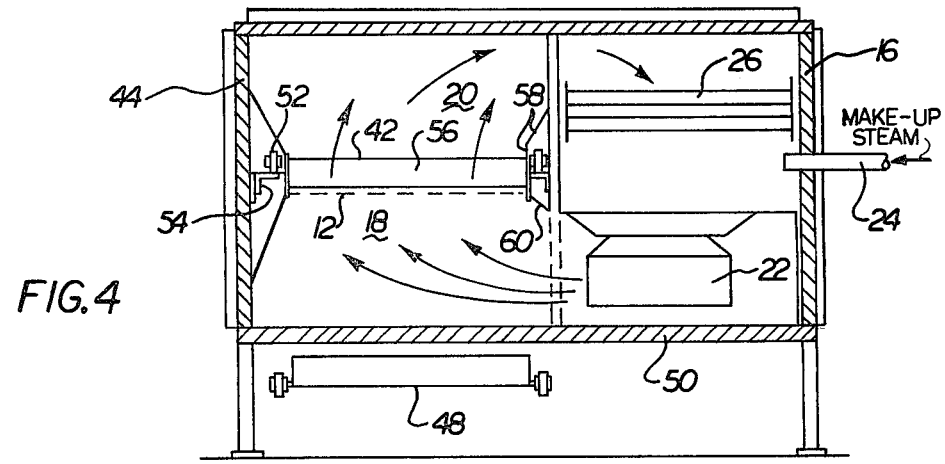

The present invention and advantages thereof will become apparent from the following description, with reference to the accompanying drawings, in which FIG. 1 is a flow chart for the present process;

FIG. 2 is a side elevation of a fluidized bed apparatus suitable for use in the present invention; and FIGS. 3 and 4 are section views taken along lines 3—3 and 4—4 of FIG. 2, respectively.

Referring to FIG. 1, the present process comprises three essential steps together with an optional pretreatment step. The food material is first, optionally, precombined with water in sufficient amount and for a sufficient time to wet the surface of the food material; is then introduced into a fluidized bed; fluidized with a steam atmosphere until it is cooked by raising its moisture content to a predetermined level; and, finally, cooled and dried to a second predetermined moisture content where the food product will remain storage stable.

FIG. 2 is a side elevation view of a fluidized bed apparatus useful in the present invention. Particulate food material from hopper 10 is discharged onto a stationary perforated plate 12, and is then conveyed along the plate in a manner to be described, through an air sealed opening 14 into a fluidized bed cooking section 16. The fluidizing medium in section 16 is steam which is circulated via plenum chambers 18 and 20 through the perforated plate 12, propelled at fluidizing velocity by blower 22 (FIG. 4). Additional make-up steam is added to this system via pipe 24 (FIG. 4) from a steam source not shown. Heater 26 maintains the steam at a desired elevated temperature. After having attained the desired predetermined moisture content, the particulate food material is advanced through air sealed wall 28 and into a cooling chamber 30 and from there into drying chamber 32, again through a sealed opening 34. Drying chamber 32 can utilize either ambient or heated air, said air being moved by blower 36 (FIG. 3) which is in turn propelled by a motor (not shown). The velocity of the drying air in chamber 32 can be sufficient to fluidize the particles in that chamber, but this is not required. After attaining a second predetermined moisture level where the food product is storage stable, the food product is conveyed out of chamber 32, through sealed opening 38, and the process is complete.

As shown in the drawings, the geometry of the several sections 16, 30, and 32 is essentially the same, except that the heater 40 (FIG. 3) in the drying section 32 is replaced by a cooler or refrigeration unit (not shown) in the cooler section 30.

The fluidized bed preferably is a controlled residence time fluidized bed system as described in copending commonly assigned application Ser. No. 177,190 (now abandoned in favor of continuation application Ser. No. 346,923, now U.S. Pat. No. 4,419,834), or is one similar to those described in U.S. Pat. Nos. 3,292,272, 3,293,768, or 2,992,921. The embodiment of FIGS. 2, 3, and 4 is similar to the system of Ser. No. 177,190.

To convey the material being cooked, there is provided an endless conveyor means 42, in the embodiment shown, extending longitudinally through the housing 44, the conveyor means having an upper run 46 and a lower run 48. The conveyor means is carried by supporting sprockets which are not shown, and can be driven by any suitable motive means. In this embodiment of the present invention, the upper run 46 of the conveyor extends through the different sections 16, 30, and 32, the lower run being positioned below the bottom wall 50 of the housing.

Rollers 52 (FIGS. 3 and 4) travel on longitudinally extending flanges 54 positioned on opposite sides of and above the perforated plate 12. The rollers are component parts of the conveyor means 42, are of conventional design, and support a plurality of spaced-apart flights 56, which extend laterally between the left-hand and right-hand rollers. These flights are vertically oriented and positioned to provide a plurality of successive spaced-apart walls moving forwardly across the upper surface of the perforated plate 12. Sides 58 and 60 above and below the perforated plate 12 cause the flow of drying air to pass through the plate to plenum chamber 20. The flights 56 are adapted to fit closely between the stationary sides 58 to avoid passage of bed material around the edges of the flights.

In operation, the material 62 to be cooked is introduced into the chute 10 and is deposited on top of the plate 12, and then is moved by the flights 56 in a sweeping motion from the point of deposit through the main cooking section 16 to the final drying chamber 32. Exit is accomplished by sweeping the material being cooked into trough 68 positioned outside of the housing adjacent to the exit end thereof.

In the embodiment of FIGS. 2 to 4, seals 64 and 66 seal the front and rear walls of the housing at points of ingress and egress of conveyor 42, and also the openings between the successive sections. As shown, the seals 64 and 66 are very simple, comprising essentially flat surfaces adapted to bridge at least two flights so that at all times there is at least one flight effectively sealing the opening through which the conveyor 42 passes.

By the use of moving flights pushing the product along over the perforated plate, the residence time of an individual particle within the unit is closely controlled, so that all particles are cooked to the same extent. In this way, overcooking of some rice (or other product) and undercooking of other product is prevented. By imparting exactly the amount of moisture required to the food product, excess moisture does not have to be removed by drying, and a more energy efficient process is realized.

If desired, a movable or stationary screen can be positioned over the top of the flights 56 to prevent levitation of lighter particles above the flights to the extent of being free from sweeping movement by the flights. Such screens can be endless and timed to move with the flights along a path of travel immediately above the flights. To avoid interference with chute 62, the screens can be on an upper conveyor adapted to mate with conveyor 42 downstream of chute 10.

In the embodiment of FIGS. 2 to 4, the bed is not fluidized at the exact point of deposit from chute 10. Fluidization at this point may or may not be necessary depending upon how sticky and subject to clumping the products are at this point. If desired, the point of deposit can be fluidized by simply feeding the particulate product into the bed through a rotary valve or other seal of known construction.

The present invention again is a process for preparing "quick-cooking" food products. The products in particulate form are introduced into the fluidized bed wherein saturated steam is utilized as the fluidizing medium until the moisture content of the food products is raised to a predetermined level and the food products are subsequently cooled and dried to a second predetermined moisture content. Food products that can be treated according to this invention include rice, cereals, grains, pasta, vegetables and other particulate food products which undergo moisture absorption during cooking.

Such food products may be presoaked or even partially precooked before treatment according to the present invention, in unit 40 (FIG. 2). Usually the presoaking is for a sufficient time to completely wet the surfaces of the materials being treated.

The fluidizing medium used in the present invention, in the cooking section 16, preferably is saturated steam for efficient heat and moisture transfer from the fluidizing medium to the food product. If the steam is superheated, moisture will tend to be removed from the food product rather than absorbed by the food product and moisture increase, at least in the preparation of "quick-cooking" foods, is important in the present process. For purposes of the present application, the term "saturated steam" means steam, including water vapor, which is not in a superheated state, particularly following contact with the product being cooked. Conceivably, slightly superheated steam could be utilized for fluidization, which on cooling, following contact with the lower temperature product, would become saturated.

A typical velocity of the steam in the fluidized bed, to fluidize the food product, particularly rice, will be about 1,000–1,500 feet per minute. This is higher than in conventional beds using air as the fluidizing medium, because of the lower density of steam.

The steam can provide all of the heat value introduced into the fluidized bed or only a portion thereof. If the steam produced only a portion of the heat value, then an auxiliary heat source is supplied such as electric heater, or heat exchange means of some type. The moisture content to which the food product is raised during cooking is predetermined according to conventional standards for production of "quick-cooking" products from the particular food material. For example, to produce a "quick-cooking" white rice, the moisture content should be raised from about 8–12% by weight before cooking to about 70% to about 75% by weight during the cooking process. Subsequently, the moisture content of the white rice should be reduced to the original value of about 8–12% by weight to render it stable and nonfermenting during subsequent storage.

The residence time in the unit will vary depending on the product being cooked. For rice, the residence time in the cooking section will be, by way of example, about 15–25 minutes. The vanes or flights for the conveyor may be about 8 inches apart, and in this way uniform cooking of all the rice particles is achieved. The width of the fluid bed may be between one and five feet, also by way of example.

Following cooking, the food product is then transferred into a cooling zone which serves the function of cooling the food product sufficiently to stop the cooking process. It has been found that the shock cooling such as by quenching with cold water used in the prior art is not required to arrest the cooking process. Preferably, cooling is achieved by fluidizing the cooked product with ambient air for a short period of time. This is then followed by fluidizing with relatively warm, relatively dry air to complete the drying process. Drying can be achieved by using ambient air for the entire process; however, extended drying times will be required if that practice is followed. A typical drying temperature will be in the range of about 250°–350° F. If desired, the drying section may not have to be fluidized if sufficient drying takes place in the cooling section for the product to achieve a nonsticky, nonclumping form. In such case, the product could be dumped from the cooling section on to a conventional moving carrier, following known practice, adapted to pass through a drying chamber which may or may not be within the housing for the cooking and cooling sections.

According to a preferred embodiment of the present invention, the fluidizing bed used for cooking and the fluidized bed used for cooling/drying communicate with each other being separated by a separating means such as an air seal to facilitate continuous processing of food product. According to this embodiment, the food material is continuously fluidized and passes through communicating treatment zones wherein the fluidizing medium changes from saturated steam to cooling air to drying air. Special economies of equipment and energy usage can thus be achieved, particularly if waste energy from the cooking zone is utilized through heat exchange means to heat the drying air in the cooling/drying zone.

What is claimed is:

1. A continuous process for preparing quick-cooking food products which comprises:
    continuously introducing particulate food material selected from the group consisting of grain, vegetables, pasta, or mixtures thereof into a fluidized bed chamber,
    fluidizing said particulate food material in said chamber utilizing steam as the fluidizing medium at a predetermined fluidizing velocity,
    moving said material through said chamber at a controlled rate closely controlling the residence time of the food material in said chamber so that the moisture content of said particulate food material is increased uniformly to a first predetermined level, thereby cooking the food material,
    continuously removing said material from said chamber,
    cooling and subsequently drying said particulate food materials until a second predetermined moisture level is achieved, said second predetermined moisture level being effective to render said food material stable and nonfermenting during subsequent storage.

2. The process of claim 1 wherein the particulate food material is advanced through said fluidized bed chamber at a controlled rate by conveyor means to control the residence time of said food material in the bed.

3. The process of claim 2 wherein said drying occurs in a fluidized bed utilizing air as the fluidizing medium.

4. The process of claim 3 wherein said cooking and said drying occur in zones sealed from each other.

5. The process of claim 2 wherein said grain is rice.

6. The process of claim 2 wherein said particulate food material is pasta.

7. The process of claim 2 wherein said particulate food material is combined with water prior to said introducing.

8. The process of claim 6 wherein said particulate food material is partially precooked prior to said introducing.

* * * * *